(12) United States Patent
Hsu et al.

(10) Patent No.: US 11,798,292 B2
(45) Date of Patent: Oct. 24, 2023

(54) DRIVING ASSISTANT METHOD, VEHICLE, AND STORAGE MEDIUM

(71) Applicant: Chiun Mai Communication Systems, Inc., New Taipei (TW)

(72) Inventors: Chih-Pu Hsu, New Taipei (TW); Jian-Cheng Lin, New Taipei (TW); Pei-Lin Chen, New Taipei (TW); Tsung-Chun Tseng, New Taipei (TW); Chien-Chun Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 335 days.

(21) Appl. No.: 17/066,894

(22) Filed: Oct. 9, 2020

(65) Prior Publication Data
US 2021/0110181 A1 Apr. 15, 2021

(30) Foreign Application Priority Data

Oct. 11, 2019 (CN) .......................... 201910961129.1

(51) Int. Cl.
*G06V 20/58* (2022.01)
*G08G 1/16* (2006.01)
(Continued)

(52) U.S. Cl.
CPC .......... *G06V 20/584* (2022.01); *B60Q 9/008* (2013.01); *G01S 13/931* (2013.01); *G01S 15/931* (2013.01); *G06T 7/62* (2017.01); *G06V 20/62* (2022.01); *G08G 1/0175* (2013.01); *G08G 1/04* (2013.01); *G08G 1/166* (2013.01);
(Continued)

(58) Field of Classification Search
CPC .... G06V 20/584; G06V 20/62; G06V 20/625; G06V 20/56; B60Q 9/008; G01S 13/931; G01S 15/931; G01S 2013/93271; G01S 13/86; G01S 13/867; G01S 15/86; G01S 2013/932; G01S 2013/9321; G01S 2013/9324; G01S 2013/93272; G06T 7/62; G06T 2207/30252; G06T 2207/30236;
(Continued)

(56) References Cited

U.S. PATENT DOCUMENTS 6,388,580 B1 * 5/2002 Graham ................. G08G 1/166
340/904
9,361,528 B2 * 6/2016 Nonaka ..................... G06T 7/50
(Continued)

FOREIGN PATENT DOCUMENTS

| CN | 105096654 | 11/2015 |
| KR | 1020160058415 | 5/2016 |
| TW | 201542409 A | 11/2015 |

*Primary Examiner* — Kathleen Y Dulaney
(74) *Attorney, Agent, or Firm* — ScienBiziP, P.C.

(57) ABSTRACT

A driving assistant method applied to a first moving vehicle is provided. The method includes capturing an image of a license plate of a second moving vehicle when the first moving vehicle is moving, and identifying a first area of the license plate in the captured image. Basic information of the second moving vehicle are obtained according to a size of the first area. Once a safe distance is determined according to driving information of the first moving vehicle and the basic information of the second moving vehicle, a warning message is transmitted when the distance between the first moving vehicle and the second moving vehicle is less than the safe distance.

11 Claims, 5 Drawing Sheets

(51) Int. Cl.
*G08G 1/04* (2006.01)
*G08G 1/017* (2006.01)
*B60Q 9/00* (2006.01)
*G01S 13/931* (2020.01)
*G01S 15/931* (2020.01)
*G06T 7/62* (2017.01)
*G06V 20/62* (2022.01)

(52) U.S. Cl.
CPC .............. *G01S 2013/93271* (2020.01); *G06T 2207/30252* (2013.01); *G06V 20/625* (2022.01)

(58) Field of Classification Search
CPC ........ G06T 2207/30261; G08G 1/0175; G08G 1/04; G08G 1/166; G08G 1/017
USPC ............ 382/104, 105; 340/435, 903; 701/70
See application file for complete search history.

(56) References Cited

U.S. PATENT DOCUMENTS

| | | | |
|---|---|---|---|
| 9,454,905 B2* | 9/2016 | Abuelsaad | B60Q 9/008 |
| 10,145,684 B1* | 12/2018 | Tofte | G06T 7/20 |
| 2010/0274414 A1* | 10/2010 | Park | B60W 30/18063 |
| | | | 701/2 |
| 2012/0075088 A1* | 3/2012 | Marentes Aguilar | B60Q 9/008 |
| | | | 340/435 |
| 2014/0000969 A1* | 1/2014 | Carruthers | G06F 11/3013 |
| | | | 177/136 |
| 2014/0037142 A1* | 2/2014 | Bhanu | G06V 10/98 |
| | | | 382/103 |
| 2015/0003670 A1* | 1/2015 | Kuehnle | G06T 7/73 |
| | | | 382/103 |
| 2016/0019791 A1* | 1/2016 | Lin | G06V 20/58 |
| | | | 382/105 |
| 2016/0129906 A1* | 5/2016 | Chen | B60W 30/09 |
| | | | 348/148 |
| 2017/0263128 A1* | 9/2017 | Chandran | G06T 7/73 |
| 2017/0309093 A1* | 10/2017 | Feng | B60W 10/10 |
| 2017/0369055 A1* | 12/2017 | Saigusa | G08G 1/161 |
| 2018/0047218 A1* | 2/2018 | Della Monica | G07C 5/0808 |
| 2019/0291728 A1* | 9/2019 | Shalev-Shwartz | B60W 50/12 |
| 2019/0389487 A1* | 12/2019 | Gowda | B60Q 1/507 |
| 2020/0130690 A1* | 4/2020 | Chow | B60W 30/0956 |
| 2020/0180656 A1* | 6/2020 | Kim | G06V 20/56 |
| 2020/0216062 A1* | 7/2020 | Hakki | B64C 39/00 |
| 2020/0327343 A1* | 10/2020 | Lund | H04W 4/46 |
| 2021/0107508 A1* | 4/2021 | Hsu | G06V 20/584 |
| 2021/0203065 A1* | 7/2021 | Stephan | H01Q 1/42 |

* cited by examiner

| Distance reference table ||||||| 
|---|---|---|---|---|---|---|
| Safe distance (m) | Driving speed of a first moving vehicle (km/h) |||||| 
| Width of a second moving vehicle (m) | Less than 60 | 60-70 | 70-80 | 80-90 | 90-100 | ... |
| Less than 1.6 | 30 | 40 | 50 | 60 | 70 | ... |
| between 1.6 and 2 | 40 | 50 | 60 | 70 | 80 | ... |
| greater than 2 | 50 | 60 | 70 | 80 | 90 | ... |

DRIVING ASSISTANT METHOD, VEHICLE, AND STORAGE MEDIUM

FIELD

The present disclosure relates to vehicle control technologies, and particular to a driving assistant method, a vehicle, and a storage medium.

BACKGROUND

Traffic accidents on highways happen from time to time. However, most traffic accidents are caused by not keeping a safe distance between two vehicles. In addition, a driver generally estimates a distance between two vehicles manually and adjusts a vehicle speed according to the estimated distance. However, the estimating of the distance between two vehicles generally exists deviations, such that it affects the control of the safe distance. Furthermore, many factors such as road conditions during the operation of the vehicle also affects the adjustment of the vehicle speed.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
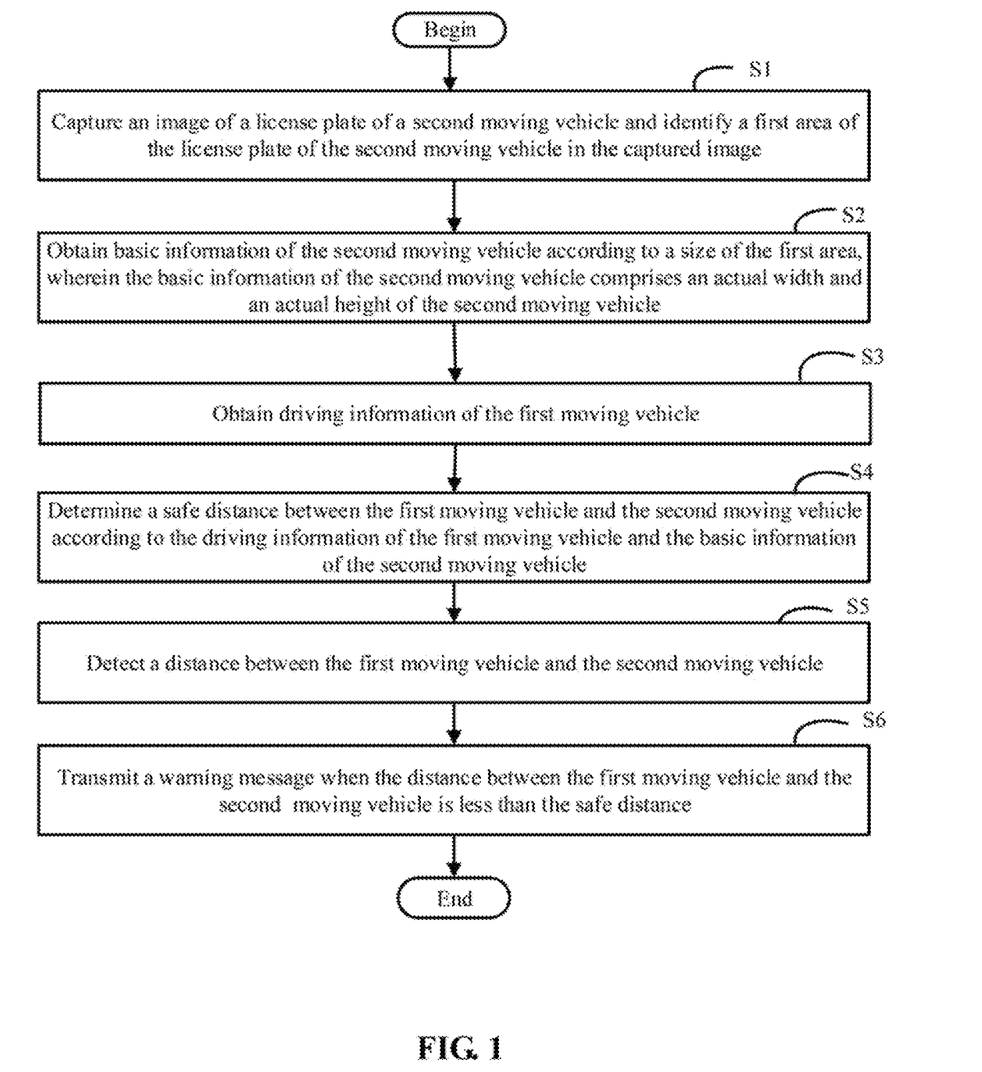
FIG. 1 shows a flowchart of one embodiment of a driving assistant method of the present disclosure.

FIG. 1 shows a flowchart of one embodiment of a driving assistant method of the present disclosure.

Figure 3:
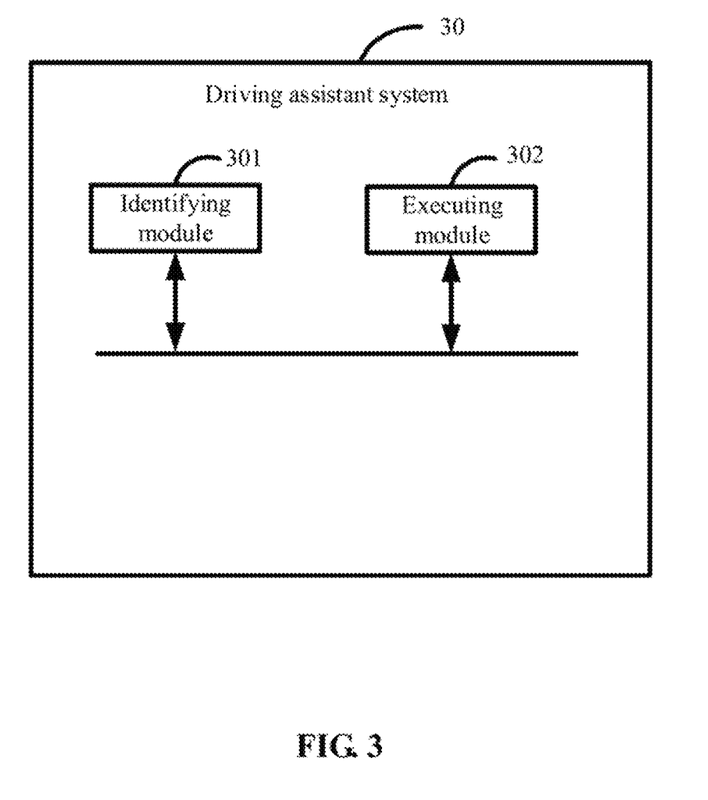
FIG. 3 shows schematic block diagram of one embodiment of modules of a driving assistant system of the present disclosure.

In one embodiment, the driving assistant method can be applied to a first moving vehicle (e.g., a moving vehicle 3 in FIG. 3). For a first moving vehicle that needs to perform a driving assistant, the function for the driving assistant provided by the method of the present disclosure can be directly integrated on the first moving vehicle, or run on the first moving vehicle in the form of a software development kit (SDK).

At block S1, the first moving vehicle captures an image of a license plate of a second moving vehicle, and identifies an area of the license plate of the second moving vehicle in the captured image. To clearly describe the disclosure, hereinafter the area of the license plate of the second moving vehicle in the captured image is referred to as "first area".

In this embodiment, the captured image includes the license plate of the second moving vehicle. The captured image can be a video or a photo. In this embodiment, the second moving vehicle is a vehicle moving in front of the first moving vehicle or a vehicle moving behind the first moving vehicle.

In one embodiment, a first camera can be installed at a front of the first moving vehicle, and a second camera can be installed at a rear of the first moving vehicle, so that when the second moving vehicle is moving in the front of the first moving vehicle, the first moving vehicle can use the first camera to capture the image of the license plate of the second moving vehicle. When the second moving vehicle is moving behind the first moving vehicle, the first moving vehicle can use the second camera to capture the image of the license plate of the second moving vehicle.

In one embodiment, the identifying the first area includes: identifying the license plate of the second moving vehicle in the captured image using a preset image recognition algorithm, such as a template matching method.

At block S2, the first moving vehicle obtains basic information of the second moving vehicle according to a size of the first area. In one embodiment, the basic information of the second moving vehicle includes an actual width of the second moving vehicle and/or an actual height of the second moving vehicle.

In this embodiment, the first moving vehicle pre-stores an actual size of the license plate of the second moving vehicle. The actual size of the license plate of the second moving vehicle includes an actual width Bw1 and an actual height Bh1.

It should be noted that the actual size of the license plate of the second moving vehicle is designated by the moving vehicle administration bureau.

In addition, it should be noted that, in order to clearly explain the present disclosure, Bw1 represents the actual width of the license plate of the second moving vehicle, and Bh1 represents the actual height of the license plate of the second moving vehicle. In addition, Cw1 represents an actual width of the second moving vehicle, and Ch1 represents an actual height of the second moving vehicle.

In a first embodiment, the obtaining the basic information of the second moving vehicle according to the size of the first area includes steps (a1)-(a3):

(a1) calculating a width Bw2 and a height Bh2 of the first area, and identifying an area of the second moving vehicle in the captured image, and calculating a width Cw2 and a height Ch2 of the area of the second moving vehicle in the captured image. To clearly describe the present disclosure, hereinafter the area of the second moving vehicle in the captured image is referred to as "second area".

In this embodiment, the width Bw2 can be obtained by calculating a total number of pixels in a horizontal direction of the first area; and the height Bh2 of the first area can be obtained by calculating a total number of pixels in a vertical direction of the first area.

Similarly, the width Cw2 of the second area can be obtained by calculating a total number of pixels in a horizontal direction of the second area; and the high Ch2 of the second area can be obtained by calculating a total number of pixels in a vertical direction of the second area.

(a2) Calculating a first ratio between the width Bw2 of the first area and the width Cw2 of the second area, and calculating a second ratio between the height Bh2 of the first area and the height Ch2 of the second area.

(a3) Calculating the actual width Cw1 and actual height Ch1 of the second moving vehicle according to the first ratio, the second ratio, and the actual size of the license plate of the second moving vehicle; wherein Cw1=Cw2*(Bw1/Bw2); Ch1 Ch2*(Bh1/Bh2).

In a second embodiment, the obtaining the basic information of the second moving vehicle according to the size of the first area includes (b1)-(b3):

(b1) Calculating a length L1 of a diagonal of the first area, identifying an area of the second moving vehicle in the captured image (as mentioned above, the area of the second moving vehicle in the captured image is referred to as the "second area"), and calculating a length L2 of a diagonal of the second area.

Specifically, the second area can be identified by using a preset image recognition algorithm such as a template matching method from the captured image.

Specifically, as described in (a1), the length of the first area can be calculated by counting a total number of pixels in a horizontal direction of the first area, the width of the first area can be calculated by counting a total number of pixels in a vertical direction of the first area. In one embodiment, the length L1 of the diagonal of the first area can be calculated based on the length and width of the first area using the Pythagorean theorem. Similarly, the length of the second area can be calculated by counting a total number of pixels in a horizontal direction of the first area, and the width of the second area can be calculated by counting a total number of pixels in a vertical direction of the second area. In one embodiment, the length L2 of the diagonal of the second area can be calculated based on the length and width of the second area using the Pythagorean theorem.

(b2) Calculating a ratio L1:L2 between the length of the diagonal of the first area and the length of the diagonal of the second area.

(b3) Calculating the actual width and actual height of the second moving vehicle according to the ratio L1:L2 and the actual size of the license plate of the second moving vehicle, wherein Cw1=Bw1*(L2/L1); Ch1=Bh1*(L2/L1), Cw1 represents the actual width of the second moving vehicle, and Ch1 represents the actual height of the second moving vehicle.

In a third embodiment, the obtaining the basic information of the second moving vehicle according to the size of the first area includes (c1)-(c3):

(c1) Counting a total number of pixels in the first area (for ease of description, N1 represents the total number of pixels in the first area); identifying an area of the second moving vehicle in the captured image (as mentioned above, the area of the second moving vehicle in the captured image is referred to as the "second area"), and counting a total number of pixels in the second area (for ease of description, N2 represents the total number of pixels in the second area).

Specifically, the second area can be identified by using a preset image recognition algorithm such as a template matching method from the captured image.

(c2) Calculating a ratio between the total number of pixels in the first area and the total number of pixels in the second area, i.e., N1:N2.

(c3) calculating the actual width Cw1 and actual height Ch1 of the second moving vehicle, according to the ratio N1:N2, and the actual size of the license plate of the second moving vehicle (i.e., the actual width Bw1 and actual height Bh1 of the license plate of the second moving vehicle), wherein Cw1=Bw1*(N2/N1); Ch1=Bh1*(N2/N1).

Figure 2A:
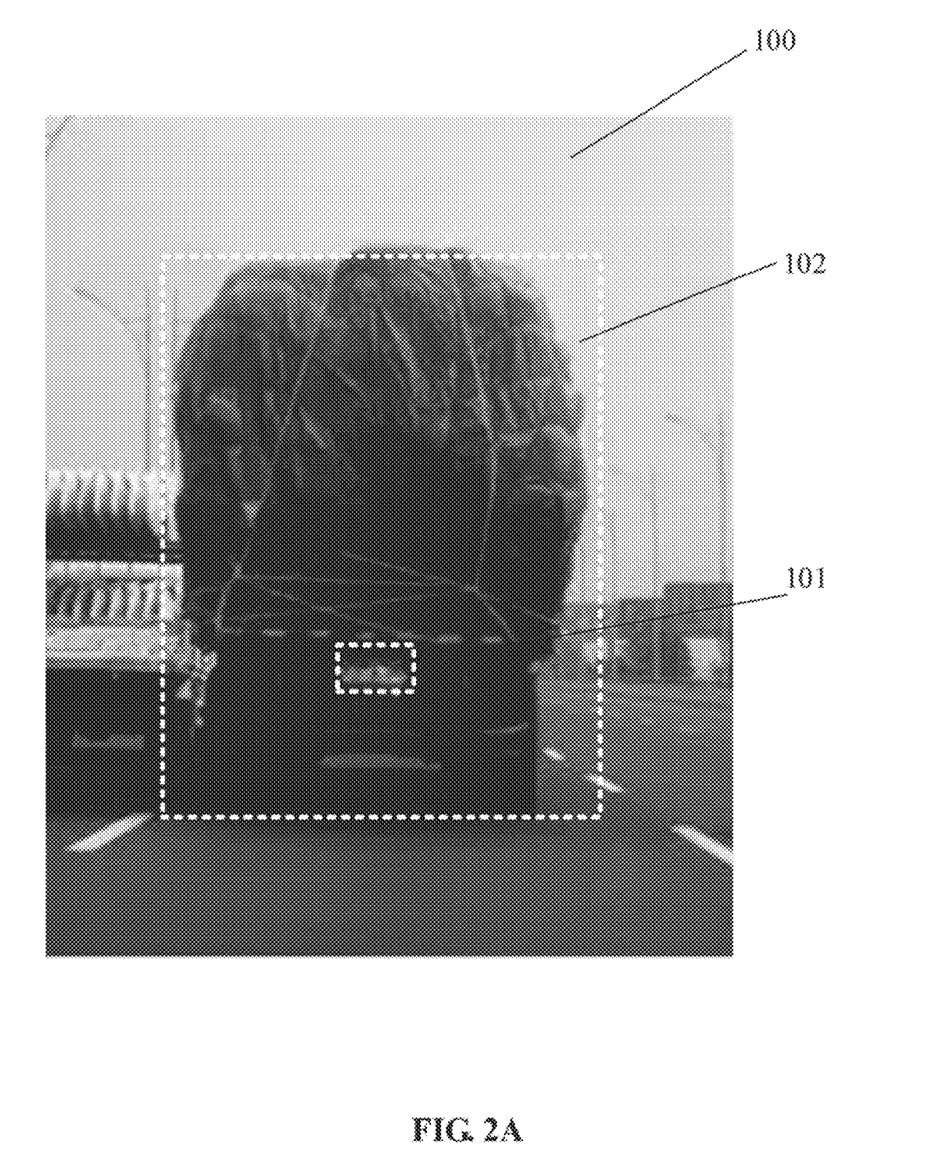
FIG. 2A shows a first area of a license plate of a moving vehicle and a second area of the moving vehicle.

For example, the picture 100 shown in FIG. 2A is the captured image. The first moving vehicle can count the total number of pixels N1 in the first area 101 (i.e., the area of the license plate of the second moving vehicle in the captured image), and count the total number of pixels N2 in the second area 102 (i.e., the area of the second moving vehicle in the captured image). The first moving vehicle can calculate the ratio between the total number of pixels N1 in the first area 101 and the total number of pixels N2 in the second area 102 (i.e., N1:N2). The first moving vehicle can then calculate the actual width Cw1 and actual height Ch1 of the second moving vehicle based on the ratio N1:N2, and the actual size of the license plate of the second moving vehicle (i.e., the actual width Bw1 and actual height Bh1 of the license plate of the second moving vehicle), wherein, Cw1=Bw1*(N2/N1); Ch1=Bh1*(N2/N1).

It can be seen from the above recitation, the actual width Cw1 and actual height Ch1 of the second moving vehicle that obtained according to the size of the first area using the first embodiment is more accurate than using the second and third embodiments.

At block S3, the first moving vehicle obtains driving information of the first moving vehicle. In one embodiment, the driving information of the first moving vehicle can include, but is not limited to, a driving speed of the first moving vehicle, a slope of a road on which the first moving vehicle is currently located, and a load of the first moving vehicle. The load of the first moving vehicle can be a maximum load of the first moving vehicle.

In one embodiment, the first moving vehicle can use a speed sensor installed in the first moving vehicle to obtain the driving speed of the first moving vehicle. In other embodiments, the first moving vehicle may also use a GPS (Global Positioning System, Global Positioning System) device installed on the first moving vehicle to obtain the driving speed of the first moving vehicle. It should be noted that the global positioning system using navigation satellites for timing, positioning and ranging, which can provide users with real-time and high-precision three-dimensional space, speed information and time information throughout the world is an existing technology.

In this embodiment, the first moving vehicle may use any method of calculating the slope of the road where the first moving vehicle is currently located. For example, the first moving vehicle may use a G-Sensor (gravity sensor) installed in the first moving vehicle to obtain the slope of the road where the first moving vehicle is currently located. In an embodiment, the slope of the road where the first moving vehicle is currently located may be uphill, flat, and downhill.

In an embodiment, the load of the first moving vehicle may be pre-stored in the first moving vehicle in advance, that is, the load of the first moving vehicle is a known number.

At block S4, the first moving vehicle determines a safe distance between the first moving vehicle and the second moving vehicle according to the driving information of the first moving vehicle and the basic information of the second moving vehicle.

In one embodiment, the first moving vehicle pre-stores a distance reference table in advance, and the distance reference table records a relationship between the driving information, the basic information, and the safe distance. The first moving vehicle may determine the safe distance between the first moving vehicle and the second moving vehicle by searching the distance reference table according to the driving information of the first moving vehicle and the basic information of the second moving vehicle.

Figure 2B:
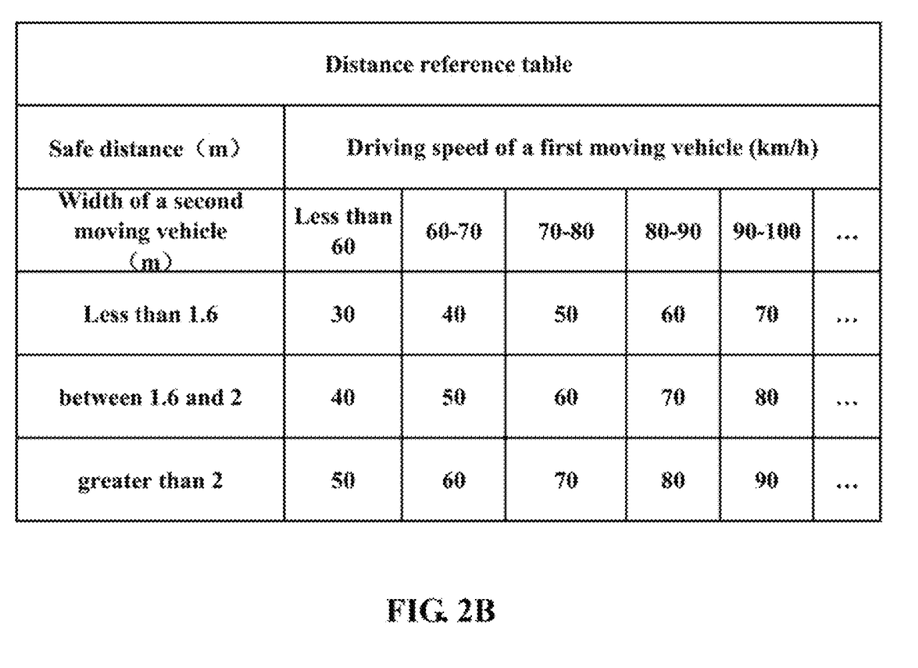
FIG. 2B shows a distance reference table.

In order to explain the present disclosure clearly and simply, it is assumed that the driving information of the first moving vehicle only includes the driving speed, and the basic information of the second moving vehicle only includes the width of the second moving vehicle. Referring to FIG. 2B, when the current driving speed of the first moving vehicle is 65 km/h, and the actual width of the second moving vehicle is 1.5 m, the safe distance between the first moving vehicle and the second moving vehicle can be determined to be 40 meters.

It should be noted that the distance reference table illustrated in FIG. 2B is only an example and cannot be interpreted as a limitation of the present invention.

At block S5, the first moving vehicle detects a distance between the first moving vehicle and the second moving vehicle.

In one embodiment, a first distance sensor may be installed at the front of the first moving vehicle, and the first distance sensor may be an ultrasonic sensor or a radar. A second distance sensor may be installed at the rear of the first moving vehicle, and the second distance sensor may be an ultrasonic sensor or a radar. When the second moving vehicle is a moving vehicle moving in front of the first moving vehicle, the first moving vehicle can use the first distance sensor to sense the distance between the first moving vehicle and the second moving vehicle. When the second moving vehicle is a moving vehicle moving behind the first moving vehicle, the first moving vehicle can use the second distance sensor to sense the distance between the first moving vehicle and the second moving vehicle.

At block S6, the first moving vehicle determines whether the distance between the first moving vehicle and the second moving vehicle is less than the safe distance. The first moving vehicle transmits a warning message when the distance between the first moving vehicle and the second moving vehicle is less than the safe distance.

In one embodiment, the transmitting the warning message may include: displaying a predetermined text message on a display of the first moving vehicle to remind a driver of the first moving vehicle to keep safe distance; and/or controlling a speaker of the first moving vehicle to issue a warning Sound effects.

FIG. 3 shows a schematic block diagram of an embodiment of modules of a driving assistant system 30 of the present disclosure.

Figure 4:
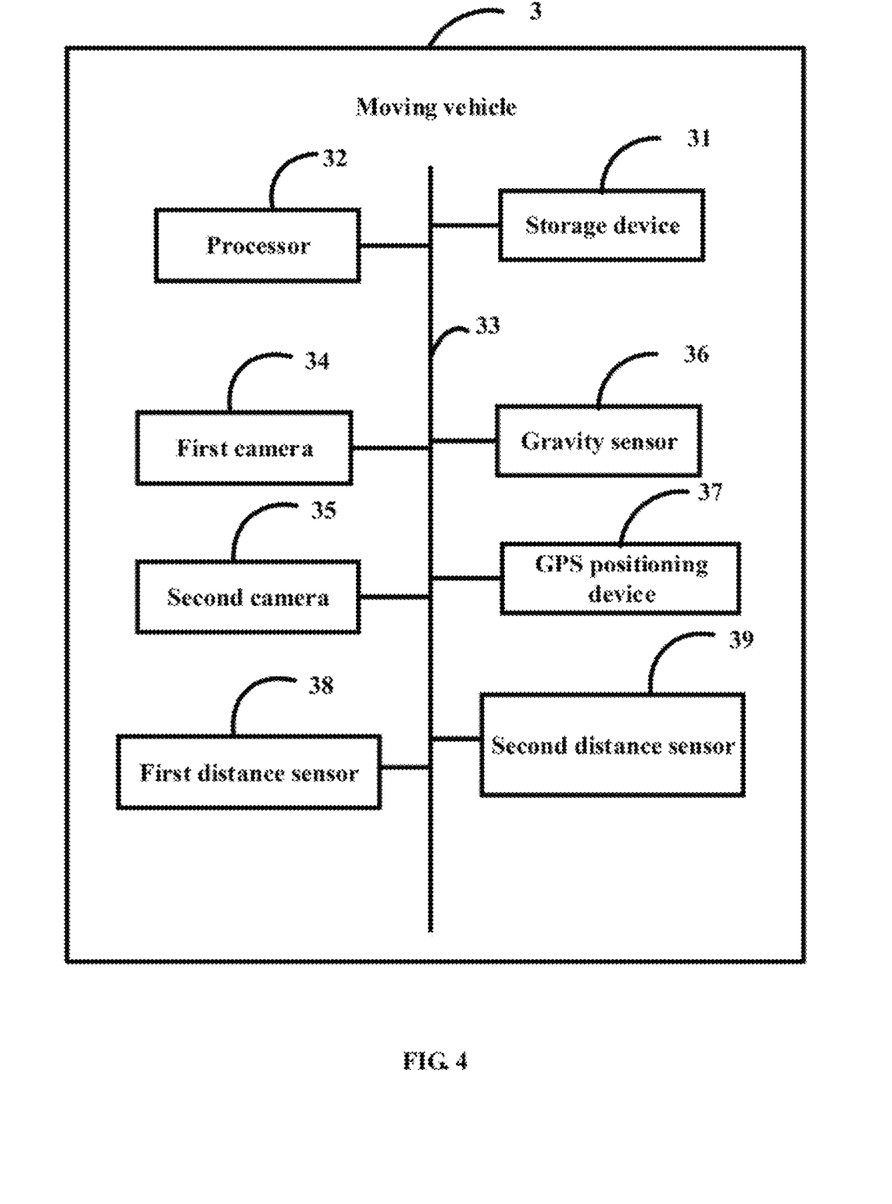
FIG. 4 shows a schematic block diagram of one embodiment of a moving vehicle of the present disclosure.

In some embodiments, the driving assistant system 30 runs in a first moving vehicle (e.g., a moving vehicle 3 shown in FIG. 4). The driving assistant system 30 may include a plurality of modules. The plurality of modules can comprise computerized instructions in a form of one or more computer-readable programs that can be stored in a non-transitory computer-readable medium (e.g., a storage device 31 of the moving vehicle 3 in FIG. 4), and executed by at least one processor (e.g., a processor 32 in FIG. 4) of the first moving vehicle (e.g., a moving vehicle 3 shown in FIG. 4) to implement driving assistant function (described in detail in FIG. 1).

In at least one embodiment, the driving assistant system 30 may include a plurality of modules. The plurality of modules may include, but is not limited to, an identifying module 301 and an executing module 302. The modules 301-302 can comprise computerized instructions in the form of one or more computer-readable programs that can be stored in the non-transitory computer-readable medium (e.g., the storage device 31 of the moving vehicle 3), and executed by the at least one processor (e.g., a processor 32 of the moving vehicle 3 in FIG. 4) of the first moving vehicle (e.g., a moving vehicle 3 shown in FIG. 4) to implement driving assistant function (e.g., described in detail in FIG. 1).

The identifying module 301 captures an image of a license plate of a second moving vehicle, and identifies an area of the license plate of the second moving vehicle in the captured image. To clearly describe the disclosure, hereinafter the area of the license plate of the second moving vehicle in the captured image is referred to as "first area".

In this embodiment, the captured image includes the license plate of the second moving vehicle. The captured image can be a video or a photo. In this embodiment, the second moving vehicle is a vehicle moving in front of the first moving vehicle or a vehicle moving behind the first moving vehicle.

In one embodiment, a first camera can be installed at a front of the first moving vehicle, and a second camera can be installed at a rear of the first moving vehicle, so that when the second moving vehicle is moving in the front of the first moving vehicle, the identifying module 301 can use the first camera to capture the image of the license plate of the second moving vehicle. When the second moving vehicle is moving behind the first moving vehicle, the identifying module 301 can use the second camera to capture the image of the license plate of the second moving vehicle.

In one embodiment, the identifying the first area includes: identifying the license plate of the second moving vehicle in the captured image using a preset image recognition algorithm, such as a template matching method.

The executing module 302 obtains basic information of the second moving vehicle according to a size of the first area. In one embodiment, the basic information of the second moving vehicle includes an actual width of the second moving vehicle and/or an actual height of the second moving vehicle.

In this embodiment, the executing module 302 pre-stores an actual size of the license plate of the second moving vehicle. The actual size of the license plate of the second moving vehicle includes an actual width Bw1 and an actual height Bh1.

It should be noted that the actual size of the license plate of the second moving vehicle is designated by the moving vehicle administration bureau.

In addition, it should be noted that, in order to clearly explain the present disclosure, Bw1 represents the actual width of the license plate of the second moving vehicle, and Bh1 represents the actual height of the license plate of the second moving vehicle. In addition, Cw1 represents an actual width of the second moving vehicle, and Ch1 represents an actual height of the second moving vehicle.

In a first embodiment, the obtaining the basic information of the second moving vehicle according to the size of the first area includes steps (a1)-(a3):

(a1) calculating a width Bw2 and a height Bh2 of the first area, and identifying an area of the second moving vehicle in the captured image, and calculating a width Cw2 and a height Ch2 of the area of the second moving vehicle in the captured image. To clearly describe the present disclosure, hereinafter the area of the second moving vehicle in the captured image is referred to as "second area".

In this embodiment, the width Bw2 can be obtained by calculating a total number of pixels in a horizontal direction of the first area; and the height Bh2 of the first area can be obtained by calculating a total number of pixels in a vertical direction of the first area.

Similarly, the width Cw2 of the second area can be obtained by calculating a total number of pixels in a horizontal direction of the second area; and the high Ch2 of the second area can be obtained by calculating a total number of pixels in a vertical direction of the second area.

(a2) Calculating a first ratio between the width Bw2 of the first area and the width Cw2 of the second area, and calculating a second ratio between the height Bh2 of the first area and the height Ch2 of the second area.

(a3) Calculating the actual width Cw1 and actual height Ch1 of the second moving vehicle according to the first ratio, the second ratio, and the actual size of the license plate of the second moving vehicle; wherein Cw1=Cw2*(Bw1/Bw2); Ch1 Ch2*(Bh1/Bh2).

In a second embodiment, the obtaining the basic information of the second moving vehicle according to the size of the first area includes (b1)-(b3):

(b1) Calculating a length L1 of a diagonal of the first area, identifying an area of the second moving vehicle in the captured image (as mentioned above, the area of the second moving vehicle in the captured image is referred to as the "second area"), and calculating a length L2 of a diagonal of the second area.

Specifically, the second area can be identified by using a preset image recognition algorithm such as a template matching method from the captured image.

Specifically, as described in (a1), the length of the first area can be calculated by counting a total number of pixels in a horizontal direction of the first area, the width of the first area can be calculated by counting a total number of pixels in a vertical direction of the first area. In one embodiment, the length L1 of the diagonal of the first area can be calculated based on the length and width of the first area using the Pythagorean theorem. Similarly, the length of the second area can be calculated by counting a total number of pixels in a horizontal direction of the first area, and the width of the second area can be calculated by counting a total number of pixels in a vertical direction of the second area. In one embodiment, the length L2 of the diagonal of the second area can be calculated based on the length and width of the second area using the Pythagorean theorem.

(b2) Calculating a ratio L1:L2 between the length of the diagonal of the first area and the length of the diagonal of the second area.

(b3) Calculating the actual width and actual height of the second moving vehicle according to the ratio L1:L2 and the actual size of the license plate of the second moving vehicle, wherein Cw1=Bw1*(L2/L1); Ch1=Bh1*(L2/L1), Cw1 represents the actual width of the second moving vehicle, and Ch1 represents the actual height of the second moving vehicle.

In a third embodiment, the obtaining the basic information of the second moving vehicle according to the size of the first area includes (c1)-(c3):

(c1) Counting a total number of pixels in the first area (for ease of description, N1 represents the total number of pixels in the first area); identifying an area of the second moving vehicle in the captured image (as mentioned above, the area of the second moving vehicle in the captured image is referred to as the "second area"), and counting a total number of pixels in the second area (for ease of description, N2 represents the total number of pixels in the second area).

Specifically, the second area can be identified by using a preset image recognition algorithm such as a template matching method from the captured image.

(c2) Calculating a ratio between the total number of pixels in the first area and the total number of pixels in the second area, i.e., N1:N2.

(c3) calculating the actual width Cw1 and actual height Ch1 of the second moving vehicle, according to the ratio N1:N2, and the actual size of the license plate of the second moving vehicle (i.e., the actual width Bw1 and actual height Bh1 of the license plate of the second moving vehicle), wherein Cw1=Bw1*(N2/N1); Ch1=Bh1*(N2/N1).

For example, the picture 100 shown in FIG. 2A is the captured image. The executing module 302 can count the total number of pixels N1 in the first area 101 (i.e., the area of the license plate of the second moving vehicle in the captured image), and count the total number of pixels N2 in the second area 102 (i.e., the area of the second moving vehicle in the captured image). The executing module 302 can calculate the ratio between the total number of pixels N1 in the first area 101 and the total number of pixels N2 in the second area 102 (i.e., N1:N2). The executing module 302 can then calculate the actual width Cw1 and actual height Ch1 of the second moving vehicle based on the ratio N1:N2, and the actual size of the license plate of the second moving vehicle (i.e., the actual width Bw1 and actual height Bh1 of the license plate of the second moving vehicle), wherein, Cw1=Bw1*(N2/N1); Ch1=Bh1*(N2/N1).

It can be seen from the above recitation, the actual width Cw1 and actual height Ch1 of the second moving vehicle that obtained according to the size of the first area using the first embodiment is more accurate than using the second and third embodiments.

The executing module 302 obtains driving information of the first moving vehicle. In one embodiment, the driving information of the first moving vehicle can include, but is not limited to, a driving speed of the first moving vehicle, a slope of a road on which the first moving vehicle is currently located, and a load of the first moving vehicle. The load of the first moving vehicle can be a maximum load of the first moving vehicle.

In one embodiment, the executing module 302 can use a speed sensor installed in the first moving vehicle to obtain the driving speed of the first moving vehicle. In other embodiments, the executing module 302 may also use a GPS (Global Positioning System, Global Positioning System) device installed on the first moving vehicle to obtain the driving speed of the first moving vehicle. It should be noted that the global positioning system using navigation satellites for timing, positioning and ranging, which can provide users with real-time and high-precision three-dimensional space, speed information and time information throughout the world is an existing technology.

In this embodiment, the executing module 302 may use any method of calculating the slope of the road where the first moving vehicle is currently located. For example, the executing module 302 may use a G-Sensor (gravity sensor) installed in the first moving vehicle to obtain the slope of the road where the first moving vehicle is currently located. In an embodiment, the slope of the road where the first moving vehicle is currently located may be uphill, flat, and downhill.

In an embodiment, the load of the first moving vehicle may be pre-stored in the first moving vehicle in advance, that is, the load of the first moving vehicle is a known number.

The executing module 302 determines a safe distance between the first moving vehicle and the second moving vehicle according to the driving information of the first moving vehicle and the basic information of the second moving vehicle.

In one embodiment, the executing module 302 pre-stores a distance reference table in advance, and the distance reference table records a relationship between the driving information, the basic information, and the safe distance. The executing module 302 may determine the safe distance between the first moving vehicle and the second moving vehicle by searching the distance reference table according to the driving information of the first moving vehicle and the basic information of the second moving vehicle.

In order to explain the present disclosure clearly and simply, it is assumed that the driving information of the first moving vehicle only includes the driving speed, and the basic information of the second moving vehicle only includes the width of the second moving vehicle. Referring to FIG. 2B, when the current driving speed of the first moving vehicle is 65 km/h, and the actual width of the second moving vehicle is 1.5 m, the safe distance between the first moving vehicle and the second moving vehicle can be determined to be 40 meters.

It should be noted that the distance reference table illustrated in FIG. 2B is only an example and cannot be interpreted as a limitation of the present invention.

The executing module 302 detects a distance between the first moving vehicle and the second moving vehicle.

In one embodiment, a first distance sensor may be installed at the front of the first moving vehicle, and the first distance sensor may be an ultrasonic sensor or a radar. A second distance sensor may be installed at the rear of the first moving vehicle, and the second distance sensor may be an ultrasonic sensor or a radar. When the second moving vehicle is a moving vehicle moving in front of the first moving vehicle, the executing module 302 can use the first distance sensor to sense the distance between the first moving vehicle and the second moving vehicle. When the second moving vehicle is a moving vehicle moving behind the first moving vehicle, the executing module 302 can use the second distance sensor to sense the distance between the first moving vehicle and the second moving vehicle.

The executing module 302 determines whether the distance between the first moving vehicle and the second moving vehicle is less than the safe distance. The executing module 302 transmits a warning message when the distance between the first moving vehicle and the second moving vehicle is less than the safe distance.

In one embodiment, the transmitting the warning message may include: displaying a predetermined text message on a display of the first moving vehicle to remind a driver of the first moving vehicle to keep safe distance; and/or controlling a speaker of the first moving vehicle to issue a warning Sound effects.

FIG. 4 shows a schematic block diagram of one embodiment of a moving vehicle 3. In an embodiment, the moving vehicle 3 may include, but is not limited to, a storage device 31, at least one processor 32, at least one communication bus 33, a first camera 34, a second camera 35, a gravity sensor 36, a GPS positioning device 37, a first distance sensor 38, and a second distance sensor 39.

It should be noted that the moving vehicle 3 may refer to the first moving vehicle or the second moving vehicle.

Those skilled in the art should understand that the structure of the moving vehicle shown in FIG. 4 does not constitute a limitation of the embodiment. The moving vehicle 3 may also include more or less other hardware or software than shown, or have different component arrangements. For example, the moving vehicle may also include communication device such as a WI-FI module and a BLUETOOTH module.

In some embodiments, the moving vehicle 3 includes a terminal that can automatically perform numerical calculation and/or information processing according to pre-set or stored instructions. A hardware of the terminal includes but is not limited to a microprocessor, an application specific integrated circuit, and Programming gate arrays, digital processors and embedded devices, etc.

It should be noted that the moving vehicle 3 is only an example, and other existing or future devices or systems that can be adapted should also be included in the protection scope of the present disclosure and are included here by reference.

In some embodiments, the storage device 31 is used to store computer program codes and various data, such as the driving assistant system 30 installed in the moving vehicle 3. The storage device 31 may include Read-Only Memory (ROM), Programmable Read-Only Memory (PROM), Erasable Programmable Read-Only Memory (EPROM), One-time Programmable Read-Only Memory (OTPROM), Electronically Erasable Programmable Read-Only Memory (EEPROM), Compact Disc Read-Only Memory (CD-ROM) or other optical disk storage, magnetic disk storage, magnetic tape storage, or any other non-volatile computer-readable storage medium that can be used to carry or store data.

In some embodiments, the at least one processor 32 may include integrated circuits, for example, may include a single packaged integrated circuit, or may include multiple integrated circuits with the same function or different functions. The at least one processor 32 may include one or a combination of multiple central processing units (CPU), microprocessors, digital processing chips, graphics processors, and various control chips. The at least one processor 32 is the control core (Control Unit) of the moving vehicle 3, which uses various interfaces and lines to connect the various components of the entire moving vehicle 3, and by running or executing programs or modules stored in the storage device 31, and call the data stored in the storage device 31 to execute various functions of the moving vehicle 3 and process data, for example, execute the function of driving assistance.

In some embodiments, the at least one communication bus 33 is configured to implement connection and communication between the storage device 31 and the at least one processor 32 and the like.

In some embodiment, the first camera 34 may be installed on the front of the moving vehicle 3 to take an image of the license plate of the moving vehicle driving in front of the moving vehicle 3. The second camera 35 may be installed at the rear of the moving vehicle 3 and used to capture images of the license plate of a moving vehicle driving behind the moving vehicle 3. The gravity sensor 36 can be used to detect the slope of the road where the moving vehicle 3 is currently located. The GPS positioning device 37 can be used to detect the driving speed of the moving vehicle 3. The first distance sensor 38 may be installed on the front of the moving vehicle 3 to sense the distance between the moving vehicle 3 and the moving vehicle driving in front of the moving vehicle 3. The first distance sensor 38 may be an ultrasonic sensor or a radar. The second distance sensor 39 may be installed at the rear of the moving vehicle 3 for sensing the distance between the moving vehicle 3 and the moving vehicle driving behind the moving vehicle 3. The second distance sensor 39 can be an ultrasonic sensor or a radar.

Although not shown, the moving vehicle 3 may also include a power source (such as a battery) for supplying power to various components. Preferably, the power source may be connected to the at least one processor 32 through a power management device, so as to provide charging through the power management device. The power management device can provide functions such as charging, discharging, and power management. The power supply may also include one or more DC or AC power supplies, recharging devices, power failure detection circuits, power converters or inverters, power status indicators, and other arbitrary components. The moving vehicle 3 may also include various sensors, BLUETOOTH module, WI-FI modules, etc., which will not be repeated here.

It should be understood that the described embodiments are for illustrative purposes only, and are not limited by this structure in the scope of the patent application.

The above-mentioned integrated unit implemented in the form of a software function module may be stored in a computer readable storage medium. The above-mentioned software function module is stored in a storage medium, and includes a number of instructions to make a moving vehicle (which may be an onboard computer, etc.) or a processor (processor) execute part of the method described in each embodiment herein.

In a further embodiment, with reference to FIG. 3, the at least one processor 32 can execute an operating device of the moving vehicle 3 and various installed applications (such as the driving assistant system 30), computer program codes, etc., for example, the various modules mentioned above.

Computer program codes are stored in the storage device 31, and the at least one processor 32 can call the computer program codes stored in the storage device 31 to perform related functions. For example, the various modules described in FIG. 3 are computer program codes stored in the storage device 31 and executed by the at least one processor 32, so as to realize the functions of the various modules for the purpose of providing driving assistance.

In an embodiment, the storage device 31 stores a plurality of instructions, and the plurality of instructions are executed by the at least one processor 32 to assist a driver.

Specifically, the method for the at least one processor 32 to implement the above instructions can be referred to FIG. 1.

It should be emphasized that the above-described embodiments of the present disclosure, including any embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A driving assistant method applied to a first moving vehicle, the driving assistant method comprising:
   capturing an image of a license plate of a second moving vehicle when the first moving vehicle is moving, and identifying a first area of the license plate of the second moving vehicle in the captured image;
   obtaining basic information of the second moving vehicle according to a size of the first area, wherein the basic information of the second moving vehicle comprises an actual width and an actual height of the second moving vehicle, wherein the obtaining of the basic information of the second moving vehicle according to the size of the first area comprises: pre-storing an actual size of the license plate of the second moving vehicle, the actual size of the license plate comprising an actual width $Bw1$ and an actual height $Bh1$ of the license plate; calculating a width $Bw2$ and a height $Bh2$ of the first area, and identifying a second area of the second moving vehicle in the captured image, and calculating a width $Cw2$ and a height $Ch2$ of the second area; calculating a first ratio between the width $Bw2$ of the first area and the width $Cw2$ of the second area, and calculating a second ratio between the height $Bh2$ of the first area and the height $Ch2$ of the second area; and calculating the actual width $Cw1$ and the actual height $Ch1$ of the second moving vehicle according to the first ratio, the second ratio, and the actual size of the license plate; wherein $Cw1=Cw2*(Bw1/Bw2)$; $Ch1=Ch2*(Bh1/Bh2)$, wherein both the first area and the second area in the captured image are rectangular areas, the second area comprises an area in the captured image where goods loaded by the second moving vehicle;
   obtaining driving information of the first moving vehicle;
   determining a safe distance between the first moving vehicle and the second moving vehicle according to the driving information of the first moving vehicle and the basic information of the second moving vehicle;
   detecting a distance between the first moving vehicle and the second moving vehicle; and
   transmitting a warning message when the distance between the first moving vehicle and the second moving vehicle is less than the safe distance.

2. The method according to claim 1, wherein the second moving vehicle is in front of the first moving vehicle or behind the first moving vehicle.

3. The method according to claim 1, wherein the driving information of the first moving vehicle comprises a driving speed of the first moving vehicle, a slope of a road on which the first moving vehicle is currently located, and a maximum load of the first moving vehicle, wherein the slope of the road where the first moving vehicle is currently located is obtained by using a gravity sensor installed in the first moving vehicle.

4. The method according to claim 1, wherein the determining the safe distance between the first moving vehicle and the second moving vehicle according to the driving information of the first moving vehicle and the basic information of the second moving vehicle comprises:
   determining the safe distance between the first moving vehicle and the second moving vehicle by searching a distance reference table according to the driving information of the first moving vehicle and the basic information of the second moving vehicle, wherein the distance reference table records a relationship between the driving information, the basic information, and the safe distance.

5. The method according to claim 1, wherein the detecting the distance between the first moving vehicle and the second moving vehicle comprises:
   detecting the distance between the first moving vehicle and the second moving vehicle by a first ultrasonic sensor or a first radar that is installed at a front of the first moving vehicle, when the second moving vehicle is driving in front of the first moving vehicle; and
   detecting the distance between the first moving vehicle and the second moving vehicle by a second ultrasonic sensor or a second radar that is installed at a rear of the first moving vehicle when the second moving vehicle is driving behind the first moving vehicle;
   wherein the transmitting of the warning message comprises: reminding a driver of the first moving vehicle to keep safe distance by displaying a predetermined text message on a display of the first moving vehicle; and controlling a speaker of the first moving vehicle to issue a warning sound effects.

6. A first moving vehicle comprising:
a storage device;
at least one processor; and
the storage device storing one or more programs, which when executed by the at least one processor, cause the at least one processor to:
   capture an image of a license plate of a second moving vehicle when the first moving vehicle is moving, and identify a first area of the license plate of the second moving vehicle in the captured image;
   obtain basic information of the second moving vehicle according to a size of the first area, wherein the basic information of the second moving vehicle comprises an actual width and an actual height of the second moving vehicle, wherein the obtaining of the basic information of the second moving vehicle according to the size of the first area comprises: pre-storing an actual size of the license plate of the second moving vehicle, the actual size of the license plate comprising an actual width $Bw1$ and an actual height $Bh1$ of the license plate; calculating a width $Bw2$ and a height $Bh2$ of the first area, and identifying a second area of the second moving vehicle in the captured image, and calculating a width $Cw2$ and a height $Ch2$ of the second area; calculating a first ratio between the width $Bw2$ of the first area and the width $Cw2$ of the second area, and calculating a second ratio between the height $Bh2$ of the first area and the height $Ch2$ of the second area; and calculating the actual width $Cw1$ and the actual height $Ch1$ of the second moving vehicle according to the first ratio, the second ratio, and the actual size of the license plate; wherein $Cw1=Cw2*(Bw1/Bw2)$; $Ch1=Ch2*(Bh1/Bh2)$, wherein both the first area and the second area in the captured image are rectangular areas, the second area comprises an area in the captured image where goods loaded by the second moving vehicle;
   obtain driving information of the first moving vehicle;
   determine a safe distance between the first moving vehicle and the second moving vehicle according to the driving information of the first moving vehicle and the basic information of the second moving vehicle;
   detect a distance between the first moving vehicle and the second moving vehicle; and
   transmit a warning message when the distance between the first moving vehicle and the second moving vehicle is less than the safe distance.

7. The first moving vehicle according to claim 6, wherein the second moving vehicle is in front of the first moving vehicle or behind the first moving vehicle.

8. The first moving vehicle according to claim 6, wherein the driving information of the first moving vehicle comprises a driving speed of the first moving vehicle, a slope of a road on which the first moving vehicle is currently located, and a maximum load of the first moving vehicle, wherein the slope of the road where the first moving vehicle is currently located is obtained by using a gravity sensor installed in the first moving vehicle.

9. The first moving vehicle according to claim 6, wherein the determining the safe distance between the first moving vehicle and the second moving vehicle according to the driving information of the first moving vehicle and the basic information of the second moving vehicle comprises:
   determining the safe distance between the first moving vehicle and the second moving vehicle by searching a distance reference table according to the driving information of the first moving vehicle and the basic information of the second moving vehicle, wherein the distance reference table records a relationship between the driving information, the basic information, and the safe distance.

10. The first moving vehicle according to claim 6, wherein the detecting the distance between the first moving vehicle and the second moving vehicle comprises:
   detecting the distance between the first moving vehicle and the second moving vehicle by a first ultrasonic sensor or a first radar that is installed at a front of the first moving vehicle, when the second moving vehicle is driving in front of the first moving vehicle; and
   detecting the distance between the first moving vehicle and the second moving vehicle by a second ultrasonic sensor or a second radar that is installed at a rear of the first moving vehicle when the second moving vehicle is driving behind the first moving vehicle;
   wherein the transmitting of the warning message comprises: reminding a driver of the first moving vehicle to keep safe distance by displaying a predetermined text message on a display of the first moving vehicle; and controlling a speaker of the first moving vehicle to issue a warning sound effects.

11. A non-transitory storage medium having instructions stored thereon, when the instructions are executed by a processor of a first moving vehicle, the processor is configured to perform a driving assistant method, wherein the method comprises:
   capturing an image of a license plate of a second moving vehicle when the first moving vehicle is moving, and identifying a first area of the license plate of the second moving vehicle in the captured image;
   obtaining basic information of the second moving vehicle according to a size of the first area, wherein the basic information of the second moving vehicle comprises an actual width and an actual height of the second moving vehicle, wherein the obtaining of the basic information of the second moving vehicle according to the size of the first area comprises: pre-storing an actual size of the license plate of the second moving vehicle, the actual size of the license plate comprising an actual width $Bw1$ and an actual height $Bh1$ of the license plate; calculating a width $Bw2$ and a height $Bh2$ of the first area, and identifying a second area of the second moving vehicle in the captured image, and calculating a width $Cw2$ and a height $Ch2$ of the second area; calculating a first ratio between the width $Bw2$ of the first area and the width $Cw2$ of the second area, and calculating a second ratio between the height $Bh2$ of the first area and the height $Ch2$ of the second area; and calculating the actual width $Cw1$ and the actual height $Ch1$ of the second moving vehicle according to the first ratio, the second ratio, and the actual size of the license plate; wherein $Cw1=Cw2*(Bw1/Bw2)$; $Ch1=Ch2*(Bh1/Bh2)$, wherein both the first area and the second area in the captured image are rectangular areas, the second area comprises an area in the captured image where goods loaded by the second moving vehicle;
   obtaining driving information of the first moving vehicle;
   determining a safe distance between the first moving vehicle and the second moving vehicle according to the driving information of the first moving vehicle and the basic information of the second moving vehicle;

detecting a distance between the first moving vehicle and the second moving vehicle; and transmitting a warning message when the distance between the first moving vehicle and the second moving vehicle is less than the safe distance.

\* \* \* \* \*